May 24, 1960

G. J. TOPOL 2,937,977

FILTER AND VACUUM DEHYDRATOR

Filed Sept. 4, 1956

INVENTOR.
GEORGE J. TOPOL

BY *Albert L. Jeffers*

ATTORNEY

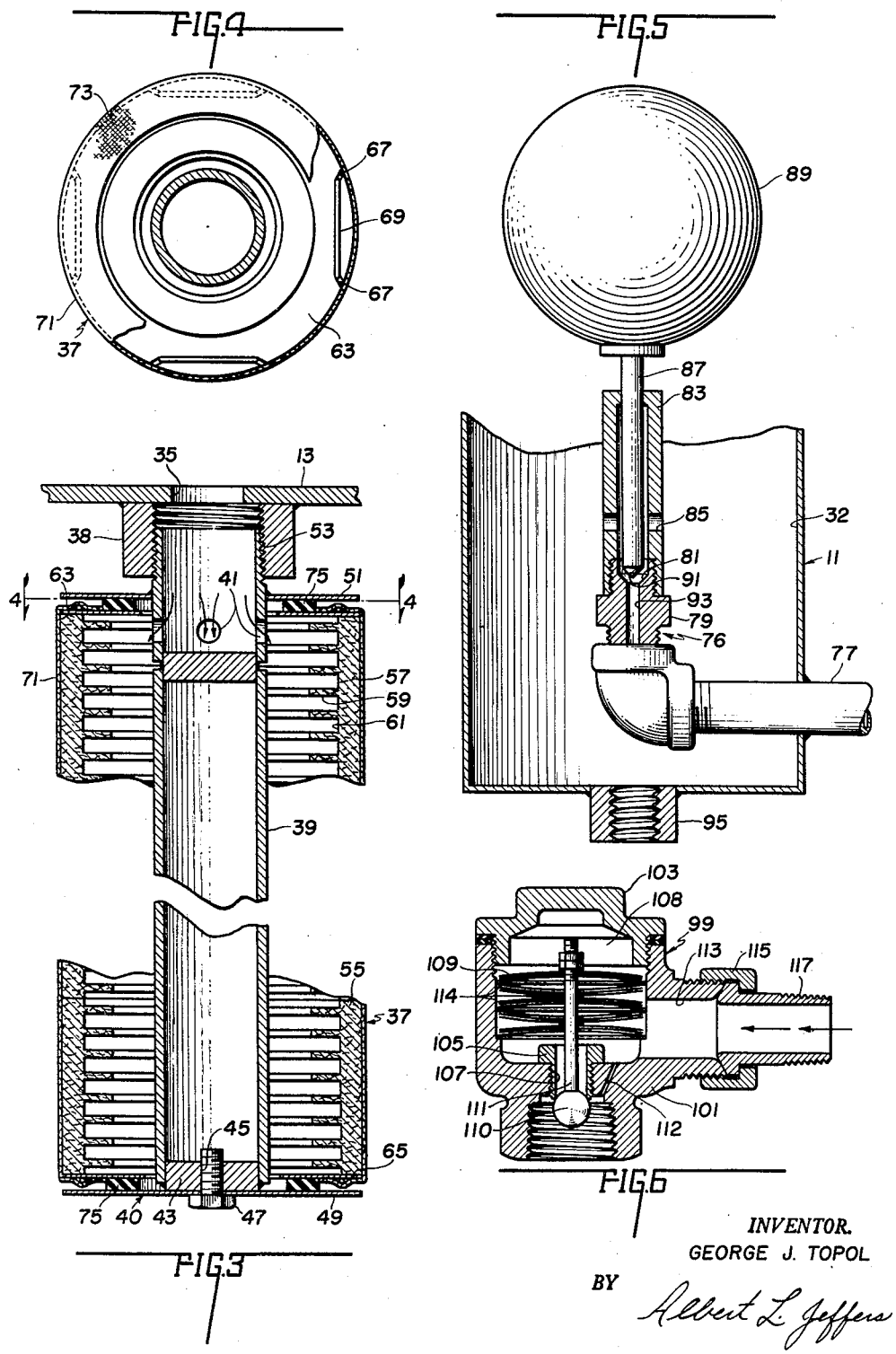

United States Patent Office 2,937,977
Patented May 24, 1960

2,937,977
FILTER AND VACUUM DEHYDRATOR

George J. Topol, Hamilton, Ontario, Canada, assignor to Bowser, Inc., Fort Wayne, Ind., a corporation of Indiana Filed Sept. 4, 1956, Ser. No. 607,901

18 Claims. (Cl. 196—46.1)

This invention relates to a filter and separator for liquids including emulsified liquids and is particularly adapted for removing contaminant and water which may be present in such liquids as lubricating oil, high detergent oil, crankcase oil, vegetable and animal oil, etc.

The occurrence of water in lubricating oil is very common. The water may enter the oil from a cooling or heating system or through a faulty bearing seal, or from an improperly packed gland. The water may also enter the lubricating system from condensation or as a result of the human factors of carelessness and neglect.

Once brought into circulation in the lubricating system, water tends to become emulsified in the bearings, the oil pump, and the oil reservoir. Thus, finely divided and dispersed throughout the system, the water becomes difficult if not impossible to remove by gravity settling or centrifuging.

Further, the water in combination with dispersed solids or sludge combined with catalytic action of surrounding metals brings about accelerated oxidation of the oil.

Lubricating oil, impoverished through oxidation, readily combines with water to form sludge which eventually becomes deposited throughout the entire lubricating system. A sludge lubricating system spells insufficient lubrication of bearings and other moving parts thereby generating abnormal heat. Excessive heat compounded with water-emulsified lubricating oil, starts acid generation in the oil with ensuing corrosive action to further accelerate failure of the equipment which results in a breakdown of the vital service the lubricating oil performs.

A new era in lubrication filtration has been brought about by the consistently increasing use of high quality additive oils resulting in higher standards for oil filtration systems. Many of the oil purifiers and filters in the prior art are now inadequate or completely obsolete when used with modern lubricating oil because the special additives contained in the oils which prevents sludge formation by keeping the solid contaminants and the water, finely dispersed in the oil body. It is apparent that under these conditions settling tanks and coarse filters can remove only very little of the foreign matter present in the oil. Further, most additives have a high affinity for water and are readily removed with it, thus depleting the oil of its original qualities.

It is a primary object of this invention to provide a filter-dehydrator which will remove contaminant, gases, strong acids and water from lubricating oils without removing the valuable additives contained therein.

Another object of the invention is the provision of a filter-dehydrator which will efficiently handle liquids without excessive foaming of the oil.

A further object of the invention is the provision of a vacuum dehydrator capable of removing water from a water-oil emulsion.

Yet another object of the invention is to provide controls for automatically adjusting the flow rate to conditions such as temperature and contamination of the incoming oil.

A still further object of the invention is the provision of an apparatus for vacuum distillation wherein the liquid is heated and vaporized in two separate chambers.

A salient object of the invention is to provide a solvent reclamation system wherein the distillation residue is automatically and continuously discharged.

Another object of the invention is the provision of a special chemically inert medium which dehydrates the oil as it passes therethrough and accelerates boiling of the water whereby the vapors are rapidly separated from the oil. The medium also functions to distribute the oil in a thin layer over a large surface area breaking vapor bubbles thus substantially reducing the foaming of oil and further serves as a fine filter for removing contaminant therefrom.

A further object of the invention is the provision of a medium which retards the progress of water droplets therethrough whereby the exposure time is greatly extended and improves heat transfer between the oil and water droplet by bringing them into relative motion.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 3 is a detail view illustrating the chemically inert medium and the means for mounting the medium within the tank;

Figure 4 is a top view on the line 4—4 of Figure 3;

Figure 5 is a detail view of the float valve;

Figure 6 is a sectional detail view of the regulator valve.

Figure 1:
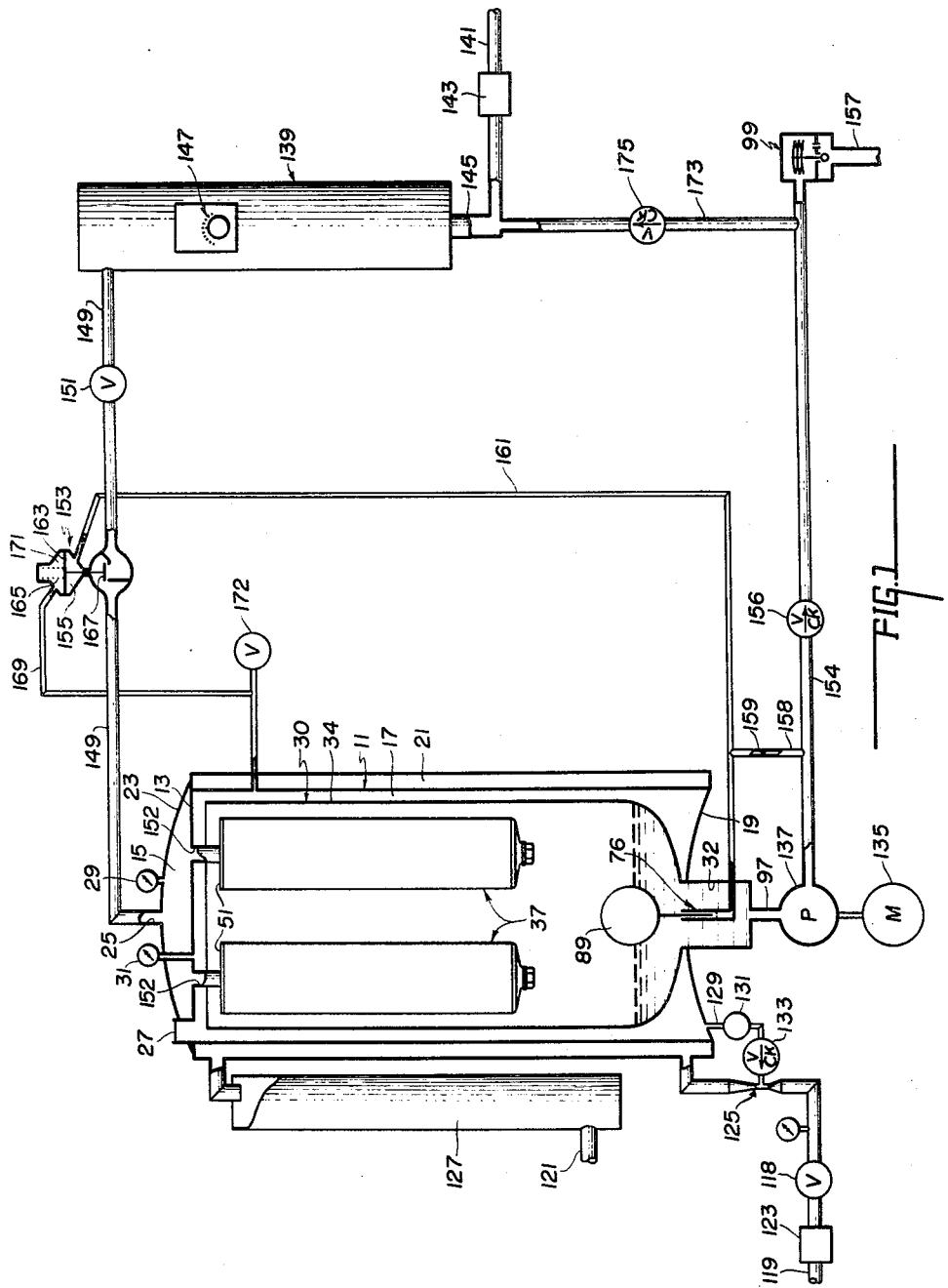
Figure 1 is a schematic flow diagram of the filter-vacuum dehydrator.

Referring to the drawing, particularly Figure 1, the numeral 11 designates a tank having a deck plate or partition which extends across the upper portion of the tank to form an inlet chamber or compartment 15 and a vacuum effluent chamber or compartment 17. The bottom or lower portion 19 of the tank is dished or concave-convex shaped so that the liquid when reaching the bottom of the tank will be kept against the water jacket 21 to prevent re-evaporation of the liquid.

The dished cover or head 23 is provided with an inlet 25 and a sight glass 27. A vacuum gage 29 is in communication with chamber 15, and a vacuum gage 31 is in communication with the chamber 17.

A collector or bucket shaped container 30 having a sump 32 is disposed beneath the separating units 37 with the walls 34 extending beyond the end plates 51 and terminating adjacent the deck plate 13 so that the carry over of minute droplets of oil into the condensate is eliminated or minimized.

The separating unit 37 more clearly illustrated in Figures 3 and 4 is secured to deck plate 13 provided with an inlet 35 and a threaded boss 38 by an element holder 40. The tubing 39 is provided with radial openings 41 and the lower end of the tubing is provided with a plug 43 welded thereto and having a threaded opening 45 to receive the bolt 47 which secures the removable plate 49 to the tube. The end plate 51 is fastened to the tubing near the threaded portion 53.

The cartridge or chemically inert medium 55 is constructed of fiber glass discs 57 and 59 having different size bores alternately arranged to form pockets or recesses 61 whereby the filter surface area is increased. The fiber glass is preferably bonded with a resin such as a phenol-formaldehyde thermosetting resin and compressed during curing of the resin so that the fiber glass is held or maintained in the compressed or predensified state by the polymerized resin.

While the cartridge may be made in different lengths, I prefer to stack the discs freely and alternately on a mandrel to a free length of approximately 24 inches and to obtain uniform density the discs are compressed to approximately 16 inches. The cartridge is maintained in this precompressed form by the end caps 63 and 65 having slots 67 for receiving a band 69 of soft wire. A sleeve or stocking 71 of cotton knit tubing of ribbed construction for yieldability is slipped over the assembled sections and the ends 73 are bent over the end surfaces of caps and cemented thereto with a suitable resilient cement. The sleeve is pervious to both water and oil. When assembled between the members 49 and 51 the cartridge is compressed approximately an additional one-half inch by tightening the bolt 47 and a seal between the gaskets 75 and the members is thus assured.

The cartridge may be combined with another cartridge to form a single cartridge depending upon the length of cartridge desired.

As illustrated in Figure 5, the float or pressure regulating valve 76 is supported within the tank by the conduit 77 having a verticle nipple 79 provided with a valve seat 81. A guide member 83 mounted on the nipple is provided with radial openings 85 and is adapted to receive the rod or stem 87 which supports the float 89. The end of the stem is provided with a pointed portion 91 for controlling the opening 93. The numeral 95 designates a threaded boss adapted to receive the conduit 97.

As shown in Figure 6 the numeral 99 designates a regulator valve of the bi-metal type which is adapted to close and open at low and high temperature, respectively. The valve housing 101 is provided with a removable cover 103 and a threaded bushing 105 is mounted in the threaded opening 107. The ball valve 110 is provided with a rod or stem 111 which extends through the bushing 105 and into the chamber 108. A number of bi-metal steel strips 109 are mounted on the rod and are separated by the spacing rings 114. The valve is provided with a bleeder orifice or bypass 112 which permits a small quantity of oil to pass through the regulator to keep the temperature of the bi-metallic strips equal to the temperature of the oil in circulation during low temperature conditions.

A threaded boss defines an inlet 113 and is adapted to receive a coupling comprising a nut 115 and nipple 117.

System and operation

To place the filter-dehydrator in operation the water inlet valve 118 is opened permitting the water to flow from the inlet line 119 to the water drain 121 through the strainer 123, valve 118, conventional venturi or eductor 125, water cooling jacket 21 and stand pipe 127. The eductor 125 will withdraw all water and condensate and will pull an operating vacuum in the chamber 17 through line 129, sight glass 131 and check valve 133.

When the vacuum reaches operating level, which may be read on the gage 31, the motor 135 driving pump 137 and heater 139 are energized. The oil to be treated enters the system through the inlet line 141, strainer 143 and passes to the heater 139 through line 145. In most cases the heater is permanently energized; however, when unusual conditions develop, for instance the temperature of the oil entering the system is too high the thermostat serves to shut the heater off. The primary purpose of the heater is to supply the heat necessary for evaporation to obtain the maximum optimum operating efficiency.

The heated oil is forced from the heater 139 to the vacuum chamber 17 by atmospheric pressure through line 149, valve 151, a diaphragm control valve 153, opening 25, chamber 15, ports 152 and separating unit 37.

It should be noted that emulsified water will not start boiling at 212° F. and that a substantially higher temperature is required to boil emulsified water. In order to dehydrate the oil at lower temperature it is necessary to apply vacuum. The function of the separating unit 37 is to coalesce or separate the water from the oil and to evenly distribute or spread the oil over a larger surface area to facilitate the vaporization of water, gases and acids. As the oil flows through the chemically inert medium of the separating unit of the contaminant contained therein is removedf and the water is coalesced or separated from the oil. When the oil and water droplets reach the surface of the cartridge the water turns to vapor and moves freely upwardly and outwardly toward the inner side of the tank 11. The dissolved air, acids and gases will move along with the vapor. When the vapor touches the tank which is cooled by the water jacket 21 it will condense into liquid and fall to the bottom 19 of the tank where it is drawn off and discharged into the cooling system by the eductor 125.

The treated oil will drop from the separating unit into the collecting tray or container 30 and returned to the lubricating system through the line 97, pump 137, line 154 having a check valve 156, regulator valve 99 and line 157.

The diaphragm control valve 153 serves to regulate the flow of oil and to keep a constant level in the collector container 30. When the pump 137 is energized, a portion of the oil will flow to the chamber 155 through line 158 having an orifice 159, line 161 and compress the diaphragm 163 against the spring 165 to open the valve 167. A balancing line 169 connects the chamber 17 with the chamber 171 so that the operation of the valve is independent of the degree of vacuum in the chamber 17. A small quantity of oil flows through lines 158 and 161 to the seat of the float valve 76 tending to open the valve and lift the float. The buoyancy of the oil acts in the same direction as the pressure on the valve, thus the valve serves as a pressure regulating valve because the oil in the line will respond to the oil level in the container. When the oil reaches a predetermined level in the container the valve 76 will open thus releasing the pressure in line 161 and the spring loaded valve 167 closes. It is obvious that this arrangement results in a very sensitive continuous throttling action of the diaphragm control valve 153. The line 169 is provided with a valve 172 for venting the tank when desired.

A bi-metal type regulator valve 99 is disposed in the discharge line so that in the event oil leaving the tank does not have the proper temperature to insure complete dehydration the valve will close or partially close whereby the oil or part of the oil will be forced to re-enter the heater 139 through the by-pass line 173 having a relief valve 175. It is a known fact that during dehydration, the oil temperature drops in proportion to the percentage of water in the oil. Thus, the regulating valve 99 adjusts the degree of recirculation in accordance with both temperature and water percentage of the incoming oil to maintain optimum operating efficiency.

Figure 2:
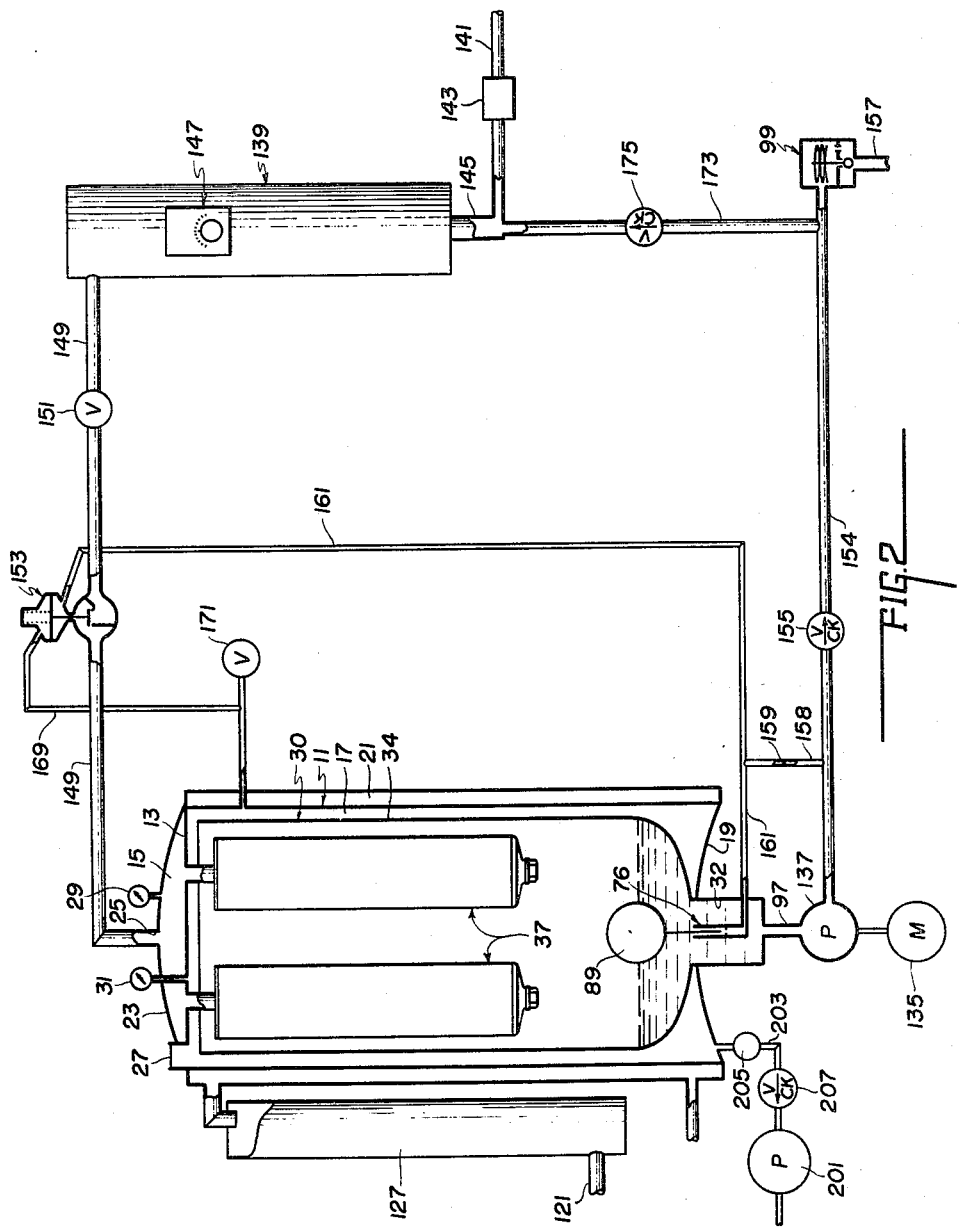
Figure 2 is a schematic flow diagram of solvent reclamation system.

The difference between the modified system illustrated in Figure 2 is primarily one of adaptability of use since the system shown in Figure 1 has general application while the system in Figure 2 falls into the field of reclamation of heavily contaminated solvents which could not be successfully handled by conventional stills.

The operation of the solvent reclamation system is basically the same as for the lubricating oils with the exception that a vacuum pump 201 is used to recover the condensate through line 203 having a sight glass 205 and a check valve 207. The heavy liquid or distillation residue is automatically and continuously discharged by the pump 137. It should be noted that in this type of distillation the liquid is heated and evaporated in two separate chambers. The temperature of the liquid in the heater is maintained below the boiling point and is forced to circulate through the heater which prevents or reduces the speed of deposit formation on the heating elements.

It is contemplated that several modifications may be made to the above described systems; for example, whenever water is scarce a refrigeration unit could be substituted for the water jacket.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A filter and water separator for lubricating oil comprising a tank having a partition for separating the tank into first and second compartments, inlet means communicating with the first compartment for supplying oil to be filtered thereto, a tubular filter-water separating unit disposed in the second compartment and communicating with the first compartment said unit adapted to coalesce the water in the oil into droplets so that they will substantially vaporize when reaching the outer surface of the unit, collecting means disposed in the second compartment for catching the purified oil, vacuum producing means including water removal means connected to the second compartment of the tank, condensing means surrounding the second compartment for condensing the vapor and outlet means communicating with the collecting means for returning the purified oil to the intended use.

2. A filter and separator apparatus comprising a tank having a deck plate mounted therein to separate the tank into first and second chambers, inlet means communicating with the first chamber for supplying liquid thereto, a tubular filter-separator unit connected to the deck plate and extending into the second chamber, said unit communicating with the first chamber said unit adapted to remove contaminant and coalesce water in the liquid so that the coalesced water will vaporize upon reaching the outer surface of the unit, collecting means disposed in the second chamber for accumulating the purified liquid said collecting means surrounding the unit and spaced therefrom, vacuum producing means connected to the second chamber, said vacuum producing means adapted to maintain a vacuum in the second chamber and to remove the separated water therefrom, cooling means surrounding the exterior of the second chamber and outlet means communicating with the collecting means for returning the purified liquid to the intended use.

3. A filter and separator apparatus comprising a tank having a first and second chamber, inlet means communicating with the first chamber for supplying unpurified liquid thereto, vacuum producing means connected to the second chamber, said vacuum producing means adapted to maintain a vacuum in the second chamber and to remove the separated liquid therefrom, a tubular filter-separator unit communicating with the first chamber, said unit adapted to remove contaminant and coalesce the entrained water into droplets so that the water droplets will vaporize when they reach the outer surface of the unit in the second chamber and will flow upwardly and outwardly toward the walls of the tank, cooling means surrounding the second chamber for condensing the vapor and outlet means communicating with the second chamber for returning the purified liquid to the intended use.

4. A filter and separator apparatus comprising a tank having a first chamber and a second chamber, inlet means communicating with the first chamber for supplying unpurified liquid thereto, vacuum producing means including drain means connected to the second chamber for maintaining an operating vacuum therein and removing the water, a tubular filter-separator unit disposed in the second chamber and communicating with the first chamber, said unit adapted to coalesce the entrained water into droplets so that the droplets will vaporize when they reach the outer surface of the unit in the second chamber and will flow upwardly and outwardly toward the walls of the tank, cooling means surrounding the second chamber for condensing the vapor, and outlet means communicating with the second chamber for returning the purified liquid to the intended use.

5. A filter and separator apparatus comprising a tank having a first chamber and a second chamber, inlet means communicating with the first chamber for supplying unpurified liquid thereto, vacuum producing means connected to the second chamber for maintaining an operating vacuum therein, a tubular filter-separator unit disposed in the second chamber and communicating with the first chamber, said unit adapted to coalesce the entrained water into droplets so that the droplets will vaporize and will flow upwardly and outwardly toward the walls of the tank, cooling means surrounding the second chamber for condensing the vapor, collecting means disposed in the second chamber for accumulating the purified liquid said collecting means including a bucket shaped container having walls spaced and surrounding said unit with its ends extending beyond said unit so that minute droplets of oil will not be carried over into the condensate, drain means associated with the vacuum producing means for removing the condensed water and outlet means communicating with the collecting means for returning the purified liquid to the intended use.

6. A filter and separator apparatus comprising a tank having an inlet chamber and a vacuum chamber, liquid supply means communicating with the inlet chamber, vacuum producing means connected to the vacuum chamber for maintaining an operating vacuum therein, a tubular filter-separator unit disposed in the vacuum chamber and adapted to communicate with the inlet chamber, said unit adapted to coalesce the water into droplets and to expose a large surface area of the incoming liquid to the vacuum chambers, cooling means surrounding the vacuum chamber, collecting means disposed in the vacuum chamber and surrounding said unit for accumulating the purified liquid, control means associated with the liquid supply means for regulating the incoming liquid, and outlet means communicating with the collecting means for returning the purified liquid to the intended use.

7. The structure defined in claim 6 wherein the control means includes a pressure operated valve.

8. A filter and separator apparatus comprising a tank having an inlet chamber and an outlet chamber, liquid supply means communicating with the inlet chamber, control means associated with the supply means including a valve responsive to the level of the liquid in the outlet chamber for limiting the amount of incoming liquid, a tubular filter-separator unit disposed in the outlet chamber and communicating with said inlet chamber said unit adapted to coalesce the water in the oil into droplets so that they will substantially vaporize when reaching the outer surface of the unit, a vacuum producing means communicating with the outlet chamber for maintaining an operating vacuum therein, cooling means surrounding the outlet chamber for condensing the vapor, and outlet means for returning the purified liquid to the intended use.

9. A filter and separator apparatus comprising a tank having an inlet chamber and a vacuum chamber, oil supply means communicating with the inlet chamber, vacuum producing means connected to the vacuum chamber for maintaining an operative vacuum therein, a tubular filter-separator unit disposed in the vacuum chamber and adapted to communicate with the inlet chamber, said unit adapted to coalesce the water in the oil and to expose a large surface area of the oil to the vacuum so that any water contained in the oil will vaporize and flow upwardly and outwardly, cooling means surrounding the vacuum chamber for condensing the vapor, collecting means disposed in the vacuum chamber and surrounding said unit for accumulating the purified oil, control means associated with the oil supply means and collecting means for limiting the amount of incoming oil, and outlet means communicating with the collecting means for returning the purified oil to the intended use.

10. The structure defined in claim 9 wherein the vacuum producing means serves as means for removing the condensed water.

11. The structure defined in claim 9 wherein the bottom portion of the tank is concavo-convex so that the water will remain substantially in an area near the cooling means to prevent re-evaporation.

12. In a purification system, the combination of tank having an inlet chamber and an outlet chamber, oil supply means including a heater communicating with the inlet chamber, vacuum producing means connected to the outlet chamber for maintaining an operative vacuum therein, a tubular filter-separator unit disposed in the outlet chamber and adapted to communicate with the inlet chamber said unit adapted to coalesce the water in the oil so that the water will substantially vaporize when reaching the outer surface area of the unit, cooling means surrounding the outlet chamber for condensing the vapor, collecting means disposed in the outlet chamber for accumulating the purified oil, control means associated with the oil supply means for limiting the amount of incoming oil and outlet means including a pump for returning the purified oil to the intended use.

13. In a purification system, the combination of a tank having an inlet chamber and a vacuum chamber, oil supply means including a thermostatic controlled heater communicating with the inlet chamber, vacuum producing means connected to the vacuum chamber for maintaining an operative vacuum therein, a tubular filter-separator unit disposed in the vacuum chamber and communicating with the inlet chamber said unit adapted to coalesce the water in the oil and water emulsion so that the water will substantially vaporize when reaching the outer surface area of the unit, cooling means surrounding the vacuum chamber for condensing the vapor, collecting means positioned in the vacuum chamber for collecting the purified oil said collecting means surrounding and spaced from said unit, first control means including a pressure operated valve associated with the oil supply means for starting and stopping the flow of incoming oil according to a predetermined level in the collecting means, second control means including a valve responsive to a predetermined temperature for by-passing the oil back through the heater.

14. In a purification system the combination of a tank having an inlet chamber and a vacuum chamber, oil supply means including a thermostatic controlled heater communicating with the inlet chamber, vacuum producing means connected to the vacuum chamber for maintaining an operative vacuum therein, a tubular filter-separator unit disposed in the vacuum chamber and communicating with the inlet chamber said unit adapted to coalesce the water in the oil and water emulsion so that the water will substantially vaporize when reaching the outer surface area of the unit, cooling means surrounding the vacuum chamber for condensing the vapor, collecting means positioned in the vacuum chamber for collecting the purified oil, outlet means including a pump communicating with the collecting means for returning the purified oil to the intended use, first control means responsive to the flow of liquid in the outlet means for starting and stopping the flow of incoming oil, second control means including temperature responsive means for by-passing the oil back through the heater.

15. In a purification system, the combination of a tank having an inlet chamber and an outlet chamber, oil supply means including a heater communicating with the inlet chamber, vacuum producing means connected to the outlet chamber for maintaining an operative vacuum therein, a number of tubular filter-separator units each including a fiber glass cartridge disposed in the outlet chamber and adapted to communicate with the inlet chamber said cartridge adapted to remove solid contaminant and to coalesce the water in the oil so that the water will vaporize when reaching the outer surface area of the cartridge, a cooling jacket surrounding the outlet chamber for condensing the vapor, a collector disposed in the outlet chamber for accumulating the purified oil, said collector adapted to surround the separating units so that the vapor will be directed upwardly, and outlet means associated with the collector for returning the purified oil to the intended use.

16. In a purification system, the combination of a tank having an inlet chamber and a vacuum chamber, oil supply means including a heater communicating with the inlet chamber, vacuum producing means connected to the vacuum chamber for maintaining an operative vacuum therein, a tubular filter-separator unit including a fiber glass cartridge disposed in the vacuum chamber and adapted to communicate with the inlet chamber said cartridge adapted to remove solid contaminant and to coalesce the water in the oil so that the water will vaporize when reaching the outer surface area of the cartridge, a cooling jacket surrounding the vacuum chamber for condensing the vapor, a collector disposed in the vacuum chamber for accumulating the purified oil said collector having walls spaced from said unit, said walls extending beyond said unit so that small droplets of oil will not be carried over into the condensate, first control means including a float operated valve for maintaining a predetermined level of oil in the collector, and outlet means including a temperature regulator control valve for returning the purified oil to the heater or to the intended use.

17. In a solvent reclamation system, the combination of a tank having an inlet chamber and a vacuum chamber, solvent supply means including a heater communicating with the inlet chamber, a vacuum pump connected to the vacuum chamber for maintaining an operative vacuum therein, a tubular filter-separator unit disposed in the vacuum chamber and communicating with the inlet chamber said unit adapted to expose a large surface area of the solvent to the vacuum so that the solvent will vaporize and flow upwardly and outwardly, a cooling jacket surrounding the vacuum chamber for condensing solvent vapor, a collector disposed in the vacuum chamber for accumulating the distillation residue said collector having walls spaced from said unit, said walls extending beyond said unit so that small droplets of oil will not be carried over into the condensate, and outlet means for automatically discharging said residue.

18. In a solvent reclamation system, the combination of a tank having an inlet chamber and a vacuum chamber, solvent supply means including a heater communicating with the inlet chamber, a vacuum pump connected to the vacuum chamber for maintaining an operative vacuum therein, a tubular filter-separator unit disposed in the vacuum chamber and communicating with the inlet chamber said unit adapted to expose a large surface area of the solvent to the vacuum so that the solvent will vaporize and flow upwardly and outwardly, a cooling jacket surrounding the vacuum chamber for condensing the solvent vapor, said vacuum pump adapted to return the recovered solvent to its intended use, a collector disposed in the vacuum chamber for accumulating the distillation residue, and outlet means for continuously discharging said residue.

References Cited in the file of this patent

UNITED STATES PATENTS

| | | |
|---|---|---|
| 1,359,453 | Watson | Nov. 16, 1920 |
| 2,302,489 | Brown | Nov. 17, 1942 |
| 2,367,851 | Eaton | Jan. 23, 1945 |
| 2,657,808 | Mankin | Nov. 3, 1953 |